A. J. BALL.
AUTOMATIC WEIGHING MACHINE.
APPLICATION FILED AUG. 30, 1913.
1,103,469.
Patented July 14, 1914.
3 SHEETS—SHEET 1.
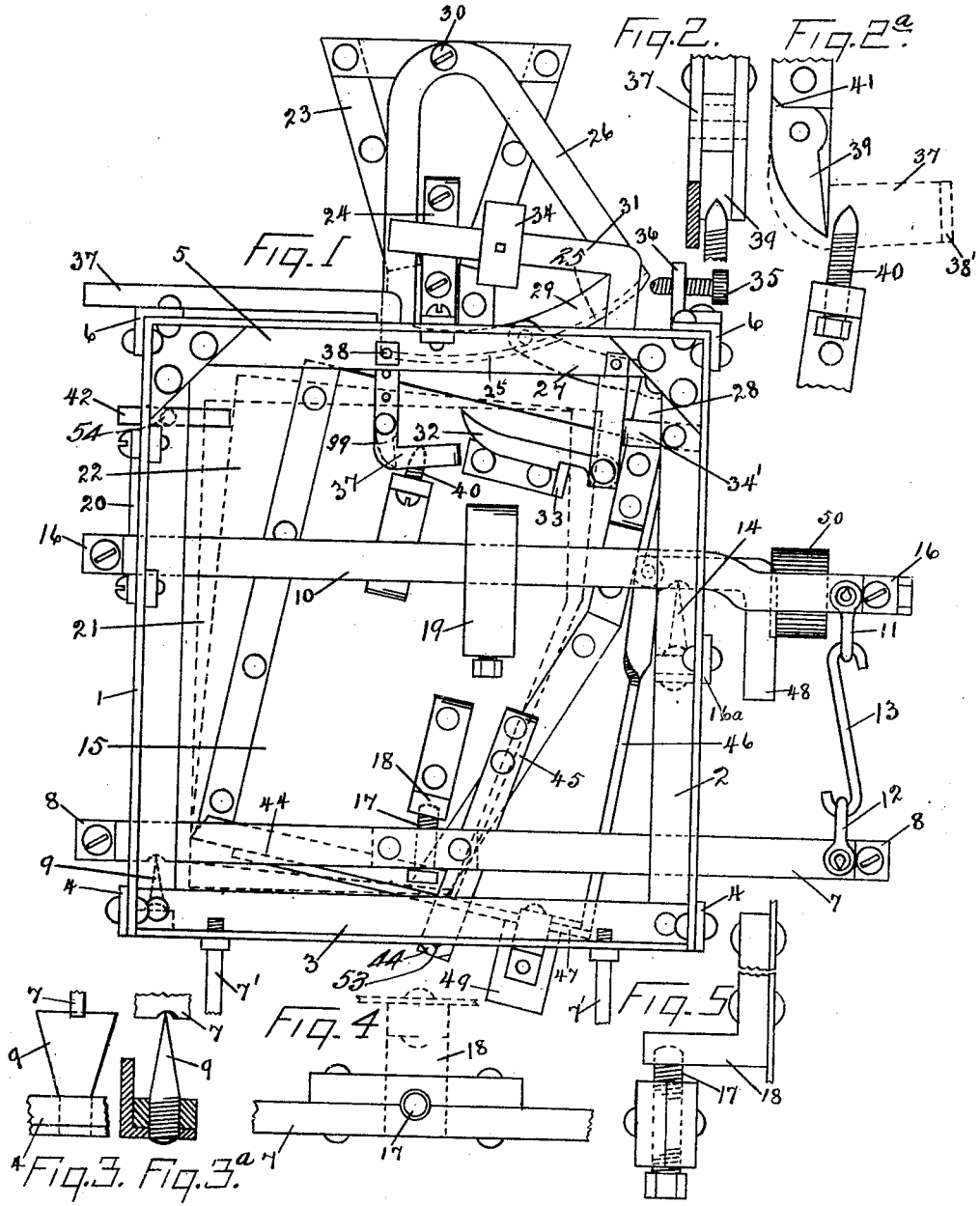
Witnesses
W. P. Tinsley.
J. W. Stith.
Inventor
A. J. Ball,
By A. L. Jackson
Attorney

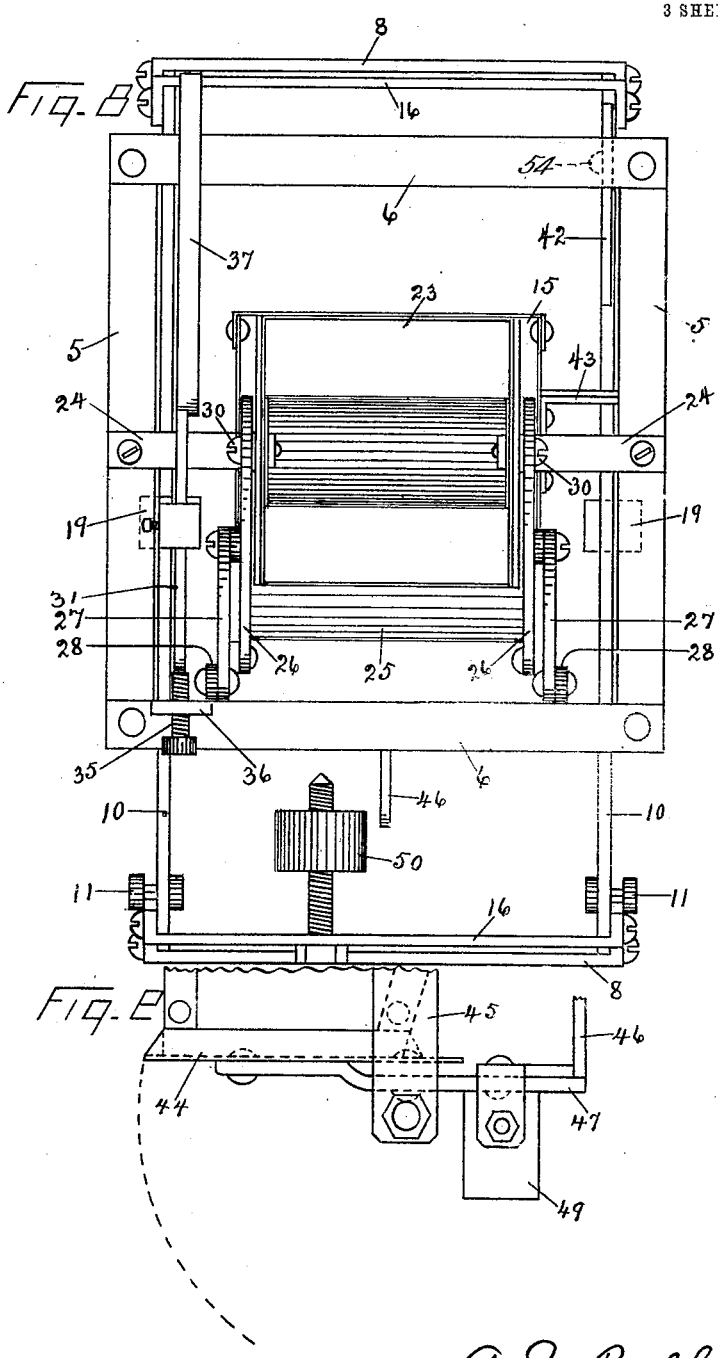

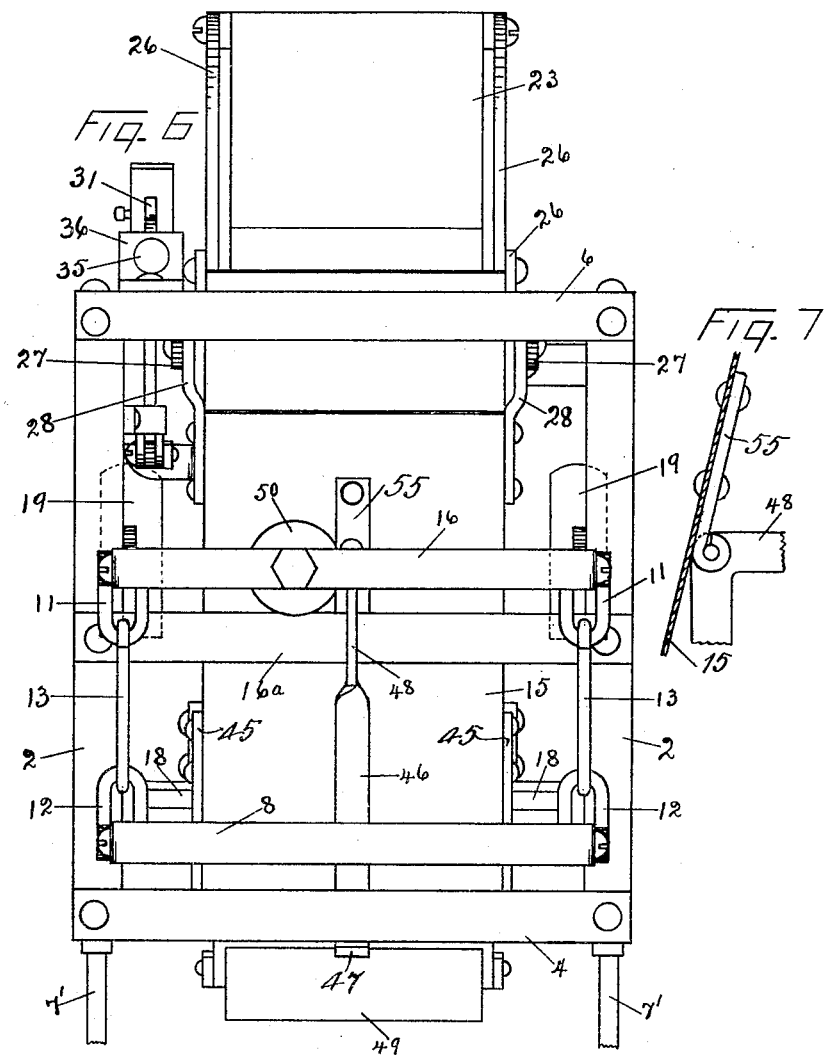

UNITED STATES PATENT OFFICE.

ANDREW J. BALL, OF FORT WORTH, TEXAS.

AUTOMATIC WEIGHING-MACHINE.

1,103,469.  Specification of Letters Patent.  Patented July 14, 1914.

Application filed August 30, 1913.  Serial No. 787,489.

*To all whom it may concern:*

Be it known that I, ANDREW J. BALL, a citizen of the United States, residing at Fort Worth, in the county of Tarrant and State of Texas, have invented certain new and useful Improvements in Automatic Weighing-Machines, of which the following is a specification.

My invention relates to automatic weighing machines for weighing grain and other small articles, and the object is to provide machines which will accurately and uniformly weigh and automatically discharge a load as soon as a predetermined amount or weight is accumulated from a falling stream of grain or other goods.

This invention is an improvement on the machine set forth in the patent granted to me on February 1, 1910, No. 947,986. At grain elevators and other storage houses, it is desirable to have a weighing machine, which once set or regulated, will weigh uniformly and with great rapidity quantities of grain or other goods.

The object of this invention is to make machines which operate with certainty when once started and operate in the same manner with the weighing of every load of goods. There is a defect in many machines in taking care of the dribble which causes irregularity in weights.

One of the objects of this invention is to provide a perfect control of the dribble.

Another object is to make the working parts rigid so that there will be very little vibrating or wabbling, the vibrating or wabbling being a cause of irregular dribble. The action should be sharp and positive.

Other objects and advantages will be fully explained in the following description and the invention will be more particularly pointed out in the claims.

Reference is had to the accompanying drawings which form a part of this application.

Figure 1 is a side elevation of the machine. Fig. 2 is an edge view of a tripping device with the long arm cut away and Fig. 2ª a side elevation, the long arm being shown in dotted outline. Fig. 3 is a detail view of a beam pivot support, being a side elevation. Fig. 3ª is an edge view of the same. Fig. 4 is detail plan view of the pivot support for one side of the discharge hopper. Fig. 5 is a side elevation of the same. Fig. 6 is a rear elevation of the machine. Fig. 7 is a detail view of the trap door release. Fig. 8 is a plan view of the machine. Fig. 9 is a detail of the trap door of the discharge hopper, being a broken side elevation of the same.

Similar characters of reference are used to indicate the same parts throughout the several views.

This invention is shown in a frame composed of upright frame pieces 1 and 2 constituting the corner frame posts, bottom side beams 3, bottom end beams 4, top side beams 5, and top end beams 6. The frame may be hung from a support or mounted on a support. Numerals 7' indicate parts of a supporting frame. A hopper supporting frame, consists of the beams 7 (which are the supporting beams) and the cross-beams 8 is pivotally mounted on knife bearings 9 at the front end and are hung or suspended at the rear end to the scale beams 10 by means of clevises 11 which are pivotally connected to the beams 10, clevises 12 which are pivotally connected to the beams 7, and by hooked link rods or bars 13. The beams 10 are supported near the rear end of the machine on knife bearings 14 which are supported by a cross-bar 16ª, so that the principal weight of the weighing mechanism is on the bearings 14. The beams 7 support the discharge hopper 15. The scale beams 10 are connected in operation by cross beams 16 at each end. The hopper 15 is supported on the beam 7 by means of the adjustable pivot bearings 17 which are screwed up through the beams 7 and by the bearing lugs 18 which are riveted to the sides of the hopper 15. Peas 19 are slidably mounted on the beams 10. These peas 19 determine the weight of the goods to be delivered. The front ends of the beams 10 are held against displacement by loops or keepers 20 in which the ends of the beams 10 are allowed space for vibrating or vertical movement. The hopper 15 rocks on the pivot bearings 17. In Fig. 1, the full line illustration of the hopper shows the hopper in loading position and the dotted outline 21 shows the hopper 15 after the feeding is stopped. Provision is made for stopping the hopper 15 in dribble position which is a position between the cut-off position and the loading position and is indicated by the dotted outline 22. The object of stopping the hopper 15 in the dribble position is to get a steady flow of the goods being fed. The hopper 15 in moving to this position moves the dribble pan, hereinafter described, to limit the flow of the goods to a steady stream. The acumulating weight of the goods causes the hopper 15 to move. The feed hopper 23 is rigidly mounted on the frame above the loading hopper 15 by angle bars 24 which are attached to the sides of the hopper 23 and to the frame pieces 5. The dribble pan or cut-off valve 25 is pivotally mounted on the hopper 23 by means of yokes 26 which are pivotally connected to the hopper 23 and pivotally connected to link bars 27. The link bars 27 are pivotally connected to lugs 28 which are rigidly connected to the hopper 15. It will be seen by this connection that whenever the hopper 15 moves the dribble pan 25 will be moved by the hopper 15. The lower parts 29 of the yokes 26 are concentric with the pivots 30 of the yokes. The dribble pan is rigidly attached to the yokes 26 and is also concentric with the pivotal connections 30. This makes the dribble pan or valve 25 move uniformly under the mouth of the hopper 23.

In order to prevent the hopper 15 from moving to dribble position too quickly, a regulating or hold back lever 31 is fulcrumed on the frame piece 5 and the lever 31 is provided with a pivoted catch 32. The catch 32 has a notch therein and rests by gravity on a lug 33 which is rigid with the hopper 15. A weight 34 is slidably mounted on the hold back lever 31 to regulate the resistance which the lever offers to the movement of the hopper 15. In going back to loading position, any suitable stop may be provided. As shown, the backward movement of the hopper 15 is limited by the yokes 26 coming against the bars 24. A stop 34' holds the lever 31 in position to be operated by the hopper 15 when the hopper moves forwardly. A set screw or bolt 35 operating through a standard 36 on frame piece 6 is used to determine the position of the dribble pan or valve 25 relative to the mouth of the feed hopper 23. In operation, the hopper 15 will, soon after the feeding commences, move toward the dribble position and will move gradually. The lever 31 will move in the opposite direction until it comes against the set screw 35 and will then stand in this position until the required weight of goods has accumulated in the hopper 15. Means are provided for releasing the hopper when the required weight is attained in the hopper. A tripping lever 37 is fulcrumed on the frame 5 at 38 and extends down under the catch 32 and has a bent arm 38' turned directly under the catch 32. The lever 37 carries a pivoted dog 39 and a tripping stud 40 is mounted on the hopper 15 which is adapted to engage the dog 39 when the hopper starts to unloading position. This will raise the lever 37 and depress the arm 38 so that as soon as the hopper 15 descends low enough the stud 40 will release the dog 39. The arm 38 will be thrown upwardly by the lever 37 and knock the catch 32 from the lug 33 so that the hopper will move to unloading position. The hopper 15 will not go to unloading position until the catch 32 releases the lug 33. The dog 39, being pivotally mounted, will permit the stud 40 to raise it up to allow the hopper to go back to loading position. In moving to unloading position, the dog 39 has a lip 41 which catches against a shoulder on the lever 37 so that the lever will be moved by the dog.

When the arm 38' trips or knocks the catch 32 away from the catch 33, the discharge hopper will move and be emptied by the tripping of the trap door hereinafter set forth, unless prevented. It may be desirable to stop the hopper 15 before the contents are discharged. When the hopper reaches the position indicated by the dotted outline 21, the feeding of wheat will be entirely cut off by the dribble pan or valve 25 which will be drawn by the hopper 15 entirely under the discharge opening of the feed hopper 23. In order to stop the discharge hopper at the position indicated by the dotted outline 22, a pivoted catch 42 stands normally in the path of a lug 43 which is rigid with hopper 15. The loaded hopper 15 will then stand until the catch 42 is tripped. The catch 42 may be manually or otherwise released from the lug 43. The catch 42 is pivotally mounted on the frame by a pivot bolt 54.

When the hopper 15 is standing in the position of the dotted outline 22, the feeding of wheat has been partially cut off by the dribble pan or valve 25 so that only a small steady stream will be falling. This position is necessary because a large falling stream of wheat would cause irregular weights.

The accumulating weight of the wheat is utilized in regulating the wheat feeding and also in dumping the load. When the hopper 15 leaves the position of the dotted outline 21, the hopper descends and the trap door is tripped. The trap door 44 is pivotally mounted on the hopper 15 by means of hangers or strips 45 which are rigid with the hopper and to which the door is pivotally connected.

The tripping devices consist of a trigger 46 which normally rests on the rear extension 47 of the bottom 44 and which is rigid with the bent bar 48 which is pivotally mounted on the hopper 15 by means of a bracket 55 attached to the hopper 15. The trigger 46 and the bar 48 move with the hopper 15 by reason of the engagement of the bar 46 with the rear extension 47, but when the hopper is nearing the limit of its downward descent, the bar 48 will strike the cross bar 16ª and this impact will drive the foot of the bar 46 from the extension 47 and thus allow the bottom 44 to dump the wheat. A weight 49 will restore the bottom 44 to normal or closed position, and as the hopper goes back to normal position, the extension 47 will ride down on the bar 46 and pass under the same for another action. Portions 52 of the metal forming the bottom 44 are bent down and connected to the straps 45 by pivot bolts 53.

In addition to the weights 19, a weight 50 is adjustably attached to the cross beam 16 of the scale beams for regulating the action of the scale beams. Attention is called to the construction of the scale frame and the supporting frame. These frames are quadrilateral rigid frames and are so made rigid because frames which are not rigid will not weigh accurately where the weighing is to be done quickly and uniformly. Weights or peas are mounted on the side beams of the scale frame. These beams constitute the scale beams.

What I claim, is,—

1. A weighing machine having a main frame, a rigid quadrilateral supporting frame within said main frame and projecting from the rear side thereof, knife bearings rigid with said main frame at the front end thereof for said supporting frame, a discharge hopper pivotally supported on said supporting frame, a quadrilateral scale frame within said main frame and projecting from the rear side thereof and pivotally mounted on the rear side of said main frame, flexible connections suspending the rear corners of said supporting frame from the rear corners of said scale frame, a feed hopper above said discharge hopper and rigid with said main frame, a dribble cut-off operatively connected to said feed hopper and to said discharge hopper whereby said dribble cut-off is operated by the movements of said discharge hopper, and peas adjustably mounted on the side beams of said scale frame for determining the amount of goods to be delivered.

2. A weighing machine having a main frame, a rigid quadrilateral supporting frame within said main frame and projecting from the rear side thereof, knife bearings for said supporting frame rigid with the front end of said main frame, a loading and discharge hopper pivotally mounted on the side beams of said supporting frame, a quadrilateral scale frame within said main frame and projecting from the rear side thereof, knife bearings rigid with the rear side of said main frame constituting pivotal supports for said scale frame, flexible connections suspending the rear corners of said supporting frame from the rear corners of said scale frame, peas suspended on the side beams of said scale frame for determining the amount of goods to be delivered, means for feeding goods to said discharge and loading hopper, and means controlled by the movement of said discharge and loading hopper for regulating the feeding of goods to said discharge and loading hopper.

3. A weighing machine having a main frame, a rigid quadrilateral supporting frame within said main frame and projecting from the rear end of the main frame, knife bearings rigid with the front end of the main frame constituting pivotal supports for the front end of the supporting frame, a loading and discharge hopper pivotally mounted on the side beams of said supporting frame, a rigid quadrilateral scale frame mounted within said main frame and projecting from the rear end thereof, a cross bar rigid with the rear end of said main frame, knife bearings attached to said cross bar and constituting pivotal supports for the side beams of said scale frame, flexible connections suspending the rear end of said supporting frame from the rear corners of said scale frame, peas adjustably mounted on the side beams of said scale frame for determining the amount of goods to be delivered, means for feeding goods to said hopper, and means controlled by said hopper for regulating the feeding of goods to said hopper.

4. A weighing machine having a main frame, a rigid quadrilateral supporting frame within the main frame and projecting from the rear end thereof, pivotal supports rigid with the front end of said main frame for the front end of said supporting frame, a discharge and loading hopper and pivotal adjustable supports therefor mounted on the side beams of said supporting frame, a rigid quadrilateral scale beam mounted within said main frame and projecting from the rear end thereof, pivotal supporting bearings rigid with the rear end of said main frame for said scale frame, links pivotally connecting the rear corners of said supporting frame to said scale frame, peas adjustably mounted on the side beams of the supporting frame for determining the amount of goods to be delivered, a regulating weight adjustably attached to the rear end of said scale frame, a feed hopper rigid with said main frame, a dribble pan and valve swingingly mounted on said feed hopper for controlling the feeding of material from the feed hopper to said discharge hopper, and link bars pivotally connected to said feed hopper and to said discharge hopper whereby said discharge hopper normally holds said valve open and by which the discharge hopper causes said valve to cut off the feed when the predetermined amount of goods has been delivered to the discharge hopper.

5. A weighing machine having a main frame, a rigid quadrilateral supporting frame within the main frame and projecting from the rear end thereof, pivotal supports rigid with the front end of the main frame for said supporting frame, a loading and discharge hopper and pivotal adjustable supports therefor mounted on the side beams of said supporting frame, a rigid quadrilateral scale frame mounted within said main frame and projecting from the rear end thereof, pivotal supports in the rear end of said main frame for said scale frame, links pivotally connected at their lower ends to the corners of said supporting frame and pivotally connected at their upper ends to the corners of said scale frame at the rear projecting ends of said frames, peas adjustably mounted on the side beams of said scale frame for determining the amount of goods to be delivered, a feed hopper rigid with said main frame, a dribble pan and valve swingingly mounted on said feed hopper, links pivotally connected to said dribble pan and valve and to said discharge hopper whereby said discharge hopper controls the feeding of material thereto, stops limiting the movement of said discharge hopper to a partial cutting off of the feed, and means automatically operated by the discharge hopper for releasing the discharge hopper when the complete load has been fed to the discharge hopper.

6. A weighing machine having a main frame, a quadrilateral supporting frame within said main frame and projecting from the rear side of said main frame and pivotally supported on the front end of said main frame, a loading and discharge hopper pivotally mounted on the side beams of said supporting frame, a quadrilateral scale frame within said main frame and projecting from the rear end thereof and pivotally supported on the rear end of the main frame, flexible connections suspending the rear end of said supporting frame on the rear end of said scale frame, means for feeding material to said hopper, means controlled by the movement of said hopper for regulating and controlling the feeding means, and means for automatically discharging the load from said hopper consisting of a cross bar attached to said main frame, a bottom pivotally attached to one side of the hopper and having a projection, and a trip engaging said projection and pivotally connected to said main frame and having one end bent backward and behind said cross bar and adapted to engage said cross bar as said hopper is descending to discharging position.

In testimony whereof, I set my hand in the presence of two witnesses, this 2nd day of August, 1913.

ANDREW J. BALL.

Witnesses:
A. L. JACKSON,
J. W. STITT.

---

Copies of this patent may be obtained for five cents each, by addressing the "Commissioner of Patents, Washington, D. C."